(12) United States Patent
Frait et al.

(10) Patent No.: US 7,765,884 B2
(45) Date of Patent: *Aug. 3, 2010

(54) VEHICLE POWERTRAIN HAVING LIVE POWER TAKE-OFF

(75) Inventors: Steven A. Frait, Milan, MI (US); Robert J. Miller, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

This patent is subject to a terminal disclaimer.

(21) Appl. No.: 11/862,390

(22) Filed: Sep. 27, 2007

(65) Prior Publication Data

US 2009/0084205 A1    Apr. 2, 2009

(51) Int. Cl.
*F16H 37/00* (2006.01)

(52) U.S. Cl. .................... 74/15.84; 74/606 R

(58) Field of Classification Search .......... 74/11, 74/15.8, 15.82, 15.84, 606 R
See application file for complete search history.

(56) References Cited

U.S. PATENT DOCUMENTS

| | | | |
|---|---|---|---|
| 3,440,901 A | 4/1969 | Chambers | |
| 3,554,056 A | 1/1971 | Cole | |
| 3,893,551 A | 7/1975 | Ahlen | |
| 3,996,817 A | 12/1976 | Winzeler | |
| 4,129,000 A | 12/1978 | Umeda et al. | |
| 4,191,072 A * | 3/1980 | Ehrlinger et al. | 475/68 |
| 4,289,044 A | 9/1981 | Dorpmund et al. | |
| 4,724,720 A * | 2/1988 | Ohkubo | 475/41 |
| 4,872,375 A | 10/1989 | Trachman et al. | |
| 7,131,929 B2 | 11/2006 | Komer et al. | |
| 2009/0114045 A1 * | 5/2009 | Wilson et al. | 74/11 |

FOREIGN PATENT DOCUMENTS

| | | |
|---|---|---|
| DE | 1926157 A1 | 11/1970 |
| GB | 1214610 A | 12/1970 |
| JP | 62004964 A | 1/1987 |
| SU | 1041323 A | 9/1983 |

* cited by examiner

*Primary Examiner*—Thomas R Hannon
*Assistant Examiner*—Terence Boes
(74) *Attorney, Agent, or Firm*—David B. Kelley; MacMillan, Sobansky & Todd, LLC

(57) ABSTRACT

A power take-off assembly for transmitting rotary power from the powertrain of a motor vehicle includes a torque converter for an automatic transmission and including an impeller shaft connected driveably to a power source, a housing having a opening through a wall of the housing, and a power takeoff gear secured to the impeller shaft, located in the housing, aligned with the opening, and supported for rotation about an axis.

13 Claims, 4 Drawing Sheets

VEHICLE POWERTRAIN HAVING LIVE POWER TAKE-OFF

BACKGROUND OF THE INVENTION

1. Field of the Invention

This invention relates generally to a motor vehicle powertrain and, in particular, to use of the powertrain as a power source for equipment that is onboard or extrinsic to the vehicle.

2. Description of the Prior Art

The engine of a motor vehicle can be used to supply power through a power take-off (PTO) to onboard equipment, such as a hydraulic pump that provides pressure to support and move a snowplow blade or a bucket boom, and to extrinsic equipment, such as a water pump or electric generator at a construction site, ranch or farm.

A conventional PTO is driven downstream of a torque converter turbine, which is hydrokinetically coupled to the engine shaft through an impeller, driveably coupled to the engine. A conventional PTO unit transmits no power when the vehicle is stopped, though the selected position of the transmission gear selector is either the reverse-range or drive-range because. For a conventional PTO to provide power to a user, the transmission must transmit power to its output In heavy truck applications, a PTO assembly generally is located axially between a transmission bell housing and the gearbox. But this arrangement does not package well in light trucks. It requires changing the rear position of the transmission, which causes mount/cross and drive shaft complexities, and is incompatible with high volume manufacturing.

A need exists in the light truck industry for a live PTO that is driven directly by the engine output regardless of the operating state of the transmission, and permits a one-piece transmission case and common driveshafts whether the vehicle is equipped with an optional PTO or the PTO is not incorporated in the vehicle.

SUMMARY OF THE INVENTION

A power take-off assembly for transmitting rotary power from the powertrain of a motor vehicle includes a torque converter for an automatic transmission and including an impeller shaft connected driveably to a power source, a housing having a opening through a wall of the housing, and a power takeoff gear secured to the impeller shaft, located in the housing, aligned with the opening, and supported for rotation about an axis.

The live PTO gear is located within the pump/stator support assembly. This arrangement eliminates complexity and the associated cost. The hydraulic feeds to pump/stator assembly go directly to the valve body and allow for a thin mounting flange. Consequently, the opening in the PTO mounting flange is positioned axially towards the bell housing, thereby allowing the PTO gear, mounted inside the pump/stator assembly, to have direct access to the PTO opening.

This arrangement also provides a one piece case or separate bell housing, alternative pump/PTO drive configurations that allow isolation the pump from the converter hub. The PTO idler gear can be integrated with pump housing or can be a separate drop-in unit that is installed when customer installs the PTO unit.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
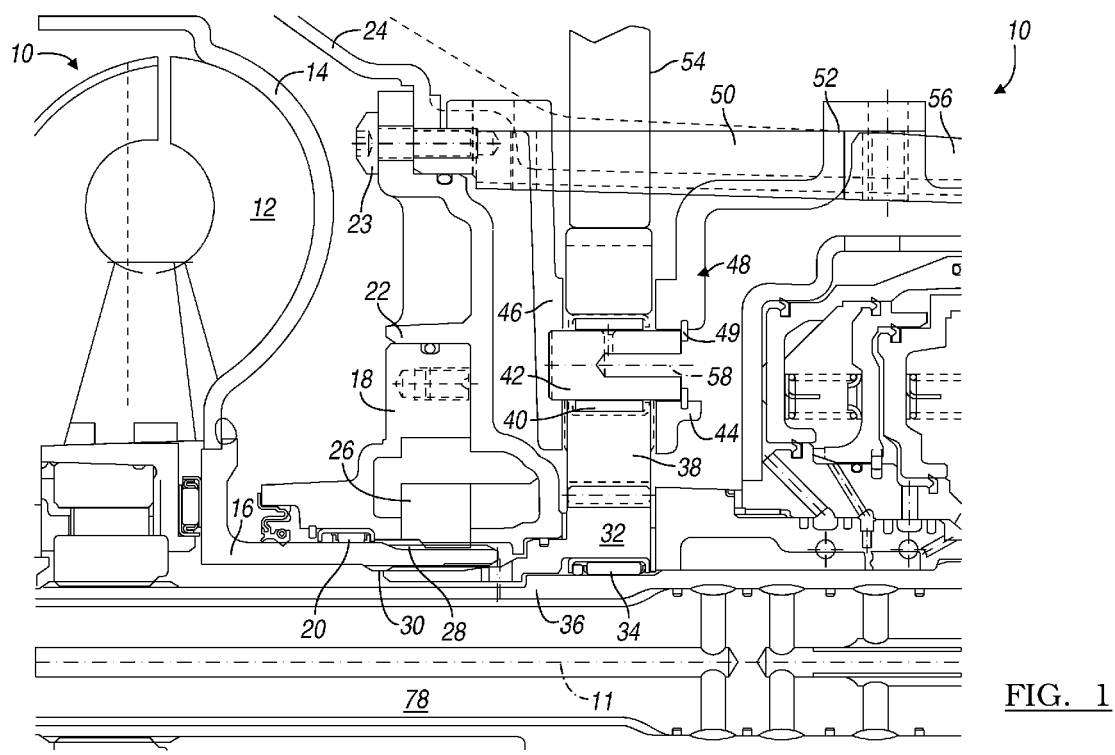
FIG. 1 is a cross sectional side view showing a torque converter, hydraulic pump and PTO unit.

Referring first to FIG. 1, a torque converter 10, located along an axis 11 between an engine and the front of an automatic transmission, includes an impeller 12 surrounded by a torque converter cover 14, which is secured to the blades of the impeller and connected driveably to the crankshaft of the engine. An impeller shaft 16, welded to the cover 14, is supported for rotation on a pump body 18 by a bearing 20. The pump body 18 is fitted into a pump support 22, which is secured by bolts 23 to the front cover 24 of the transmission. The pump body 18 contains a hydraulic pump, whose gear or rotor 26 is connected by an external spline 28 to impeller shaft 16.

An internal spline 30 on impeller shaft 16 connects that shaft to the pinion 32 of a PTO. Gear 32 is supported by a bearing 34 located on a shoulder of a stator shaft 36, which extends axially from the stator of torque converter 10. PTO gear 32 meshes with a PTO idler gear 38, which is supported on a bearing 40 and a stub shaft 42, fitted into the lugs 44, 46 of PTO idler gear support 48. A snap ring 49 secures shaft 42 in position on the support 48.

The transmission housing 56 is formed with a covered opening 50 surrounded by a mounting surface 52. The cover is removed when the PTO unit is installed. The idler support 48 is removeably attached to and supported on mounting surface 52 while the PTO is being used. The PTO idler gear 38 is located such that it engages with an output gear 54, located on equipment 55 (seen best in FIG. 2) that is to be driven by the PTO. Output gear 54 extends through the opening 50 into the space enclosed by the transmission housing 56. Front cover 24 may be separate from transmission housing 56 such that the opening 50 is integrated solely in the housing 56, or cover 24 and housing 56 may be integral comprising a single housing.

In operation with the engine running, impeller 12, impeller shaft 16 and PTO gear 32 are driven by the engine in rotation about axis 11. PTO idler gear 38 is driven by gear 32 and rotates on the idler support 48 about axis 58. Power from the engine is transmitted through the PTO assembly, PTO idler gear 38 and output gear 54 to the subject equipment 55.

Figure 2:
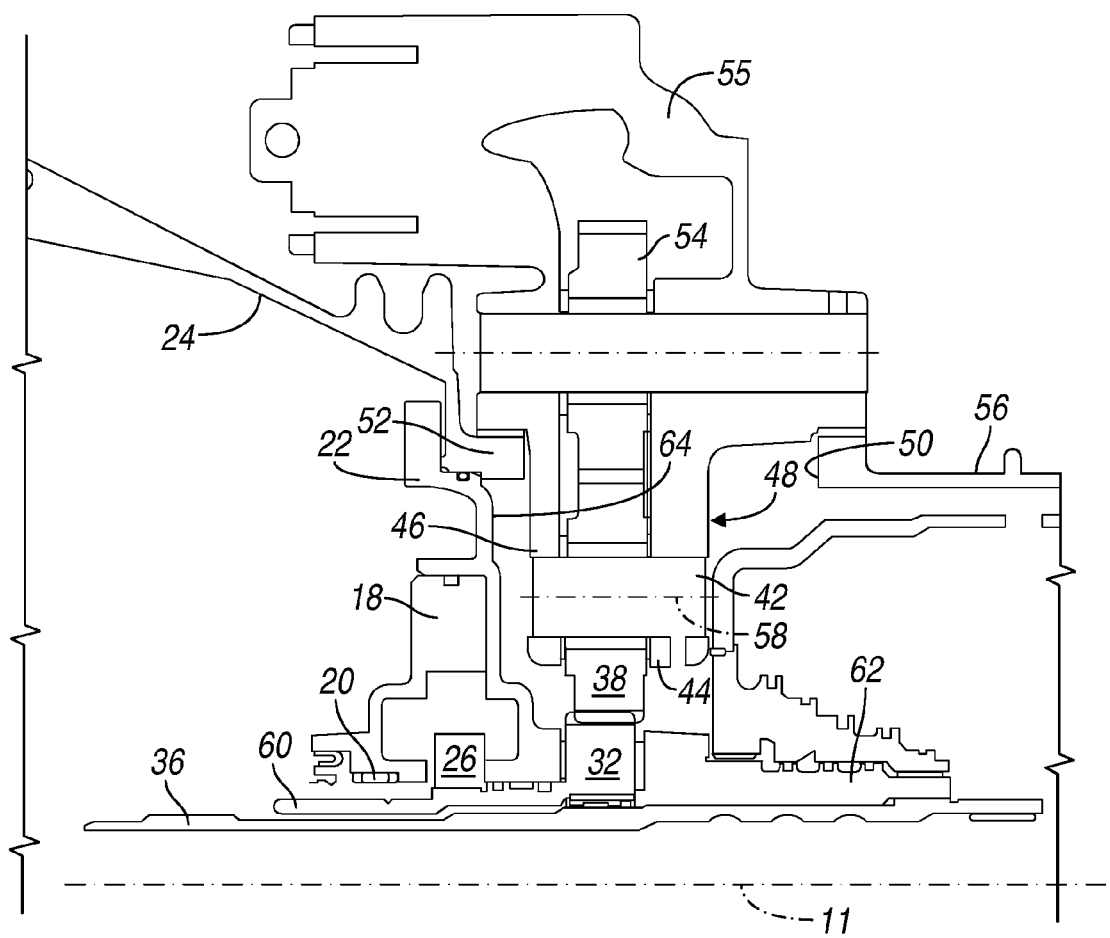
FIG. 2 is a cross section showing a second embodiment of the PTO unit.

FIG. 2 illustrates a second embodiment, in which the PTO gear 32 is formed integrally with a pump drive or an impeller shaft 60. A transmission torque converter stator support assembly 62 is spaced axially from the rear face 64 of pump support 22, thereby providing a space in which the PTO gear 32 is located and the PTO idler gear 38 extends through the opening 50 to engage gear 32 and gear 54.

Figure 3:
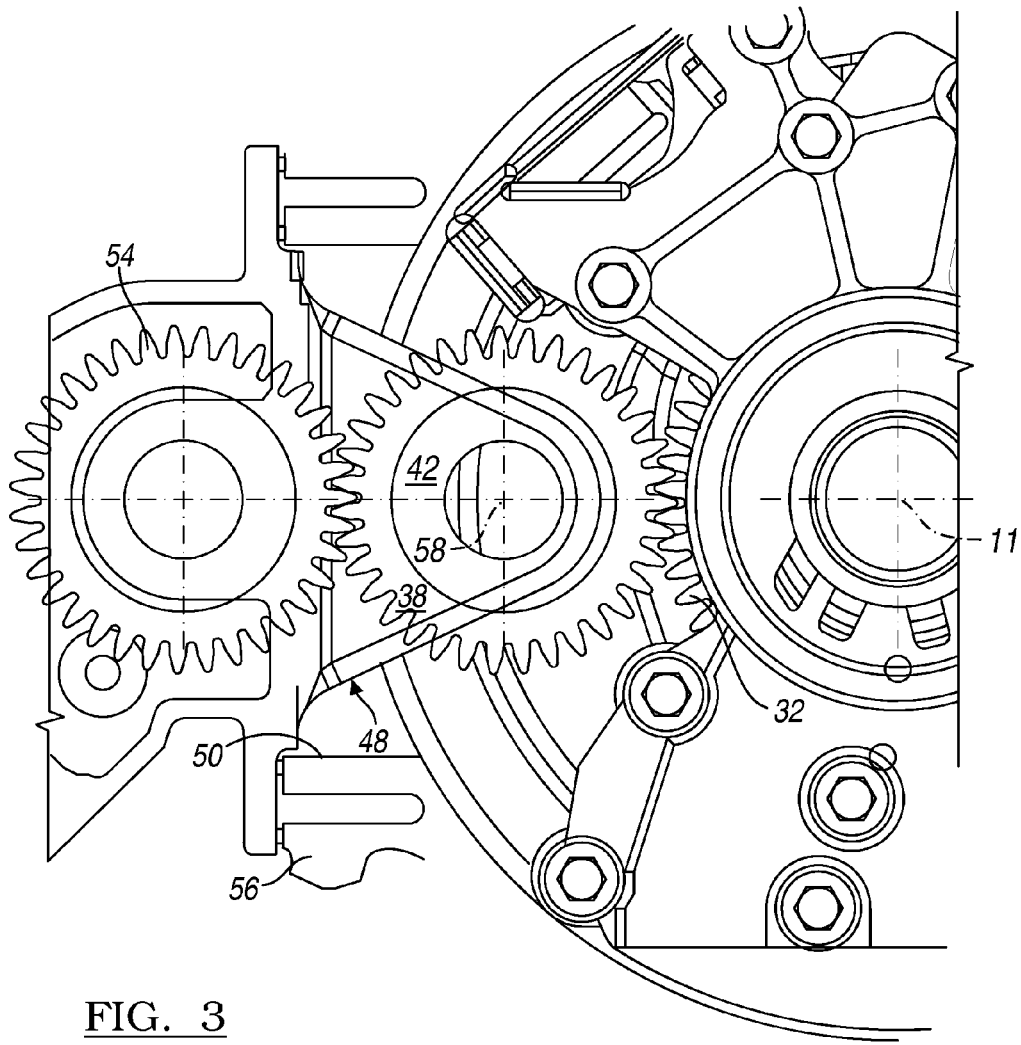
FIG. 3 is a partial front view of the transmission oil pump assembly; PTO unit and idler.

FIG. 3 shows the teeth of PTO gear 32 meshing with the teeth of PTO idler 38 at a radial line extending from axis 11. External radial access to PTO gear 32 is provided to PTO idler 38 through the opening 50 in the wall of housing 56.

Figure 4:
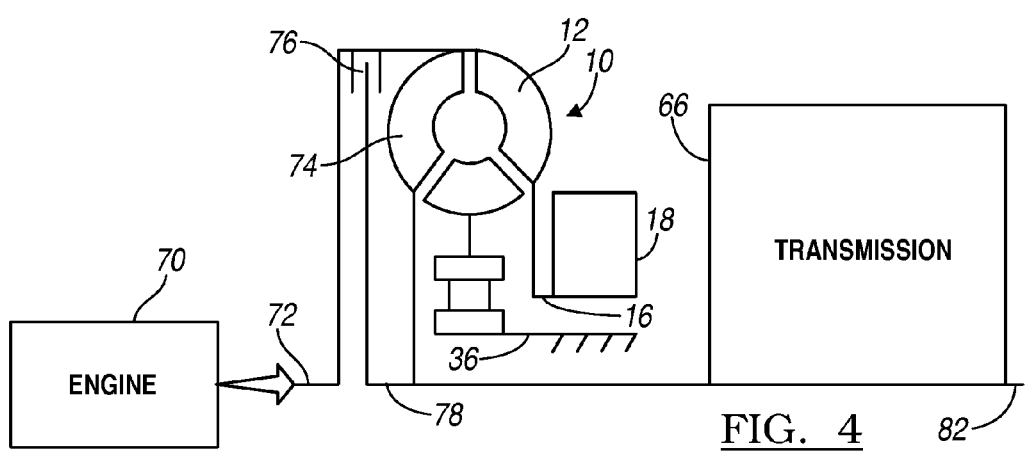
FIG. 4 is a schematic diagram showing a motor vehicle powertrain to which the PTO unit can be applied.

FIG. 4 is a schematic diagram showing a portion of a vehicle powertrain, whose power source is an engine 70 having a crankshaft 72 driveably connected to the impeller cover and impeller 12. The impeller shaft 16 is connected driveably to the rotor in the pump body 18. A bladed turbine 74 is hydrokinetically coupled to impeller 12 and is driven by hydraulic fluid exiting the impeller. A lock-up clutch 76 engages and disengages alternately in response to control of a transmission controller. When clutch 76 is engaged, a mechanical connection between engine crankshaft 72 and the transmission input shaft 78 is produced, such that the hydrokinetically coupling is inoperative. The input shaft 78 of transmission 66 transmits power to a gear box containing gears, shafts, solenoids, clutch and brakes, which cooperate to produce various gear ratio of the transmission 66. The wheels of the vehicle are driven from the transmission output shaft 82.

Figure 5:
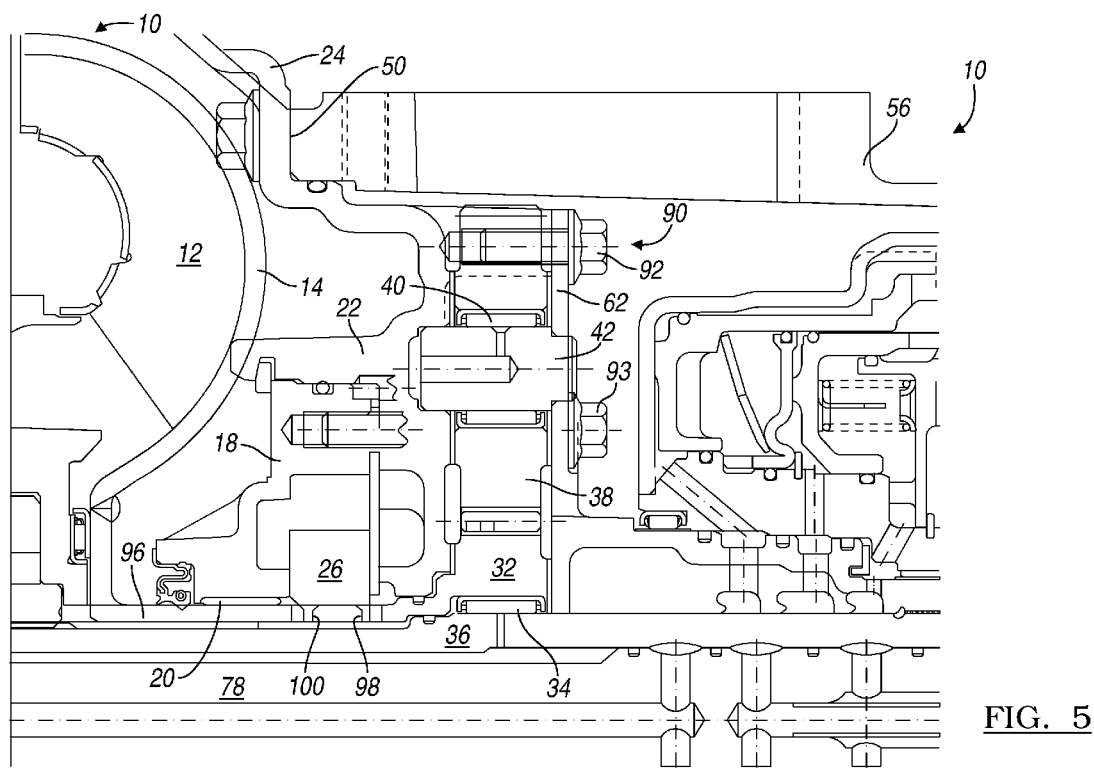
FIG. 5 is a cross sectional side view showing a third embodiment of the PTO unit.

FIG. 5 illustrates a third embodiment in which an idler support 90 is integrated with both the stator support 62 and the pump support 22 by bolts 92, 93 that is secured in position within the transmission 66. The idler gear 38, bearing 40, shaft 42 are not removed from the transmission housing 56 when the PTO is not being used to transmit power. Instead, the output gear 54 and its engagement with PTO idler gear 38 are removed from the housing 56 when the PTO is not being used to transmit power. Then the opening 50 in housing 56 is closed with a cover.

Impeller shaft 96 is formed with teeth 98 at its axial end, which engage teeth 100 formed on the adjacent end of PTO gear 32, thereby driveably connecting shaft 96 and gear 32 mutually.

In accordance with the provisions of the patent statutes, the preferred embodiment has been described. However, it should be noted that the alternate embodiments can be practiced otherwise than as specifically illustrated and described.

What is claimed is:

1. A power take-off assembly, comprising:
   a shaft connecting an impeller to a pump rotor through a spline, and to a pinion through an internal shaft spline, and supporting the pump rotor in rotation;
   a support supporting an idler in rotation;
   a power takeoff gear driveably connected to the pinion through the idler;
   a housing having an opening radially aligned with the power takeoff gear and secured to the support.

2. The assembly of claim 1, wherein:
   the idler is supported on a stub shaft that is supported on the housing through the support, the idler meshes with the pinion and power takeoff gear, and the idler and pinion are aligned radially with the opening and the power takeoff gear.

3. The assembly of claim 2, wherein the support and the idler are removable from the housing through the opening.

4. The assembly of claim 1, further comprising:
   a pump support secured to the housing;
   a gear box of a transmission spaced from the pump support and providing a space therebetween, the pinion and idler being located in said space.

5. The assembly of claim 1, further comprising:
   a pump support;
   a pump body engaged with the pump support, the pump rotor being fitted in the pump body.

6. The assembly of claim 1, wherein the support and the idler on the support can be moved in a radial direction through the opening into and out of the housing.

7. A power take-off assembly, comprising:
   a shaft connecting an impeller to a pump rotor through a spline, and to a pinion through an internal shaft spline, and supporting the pump rotor in rotation;
   an idler support supporting an idler in rotation;
   a power takeoff gear driveably connected to the pinion through the idler;
   a pump support rotatably supporting the pump rotor;
   a housing having an opening radially aligned with the power takeoff gear and secured to the idler support and pump support.

8. The assembly of claim 7, further comprising:
   a gear box spaced from the pump support and providing a space therebetween, the pinion and idler being located in said space.

9. The assembly of claim 7, further comprising:
   a pump body engaged with the pump support, the pump rotor being fitted in the pump body.

10. The assembly of claim 7, wherein the idler support and the idler on the idler support can be moved in a radial direction through the opening into and out of the housing.

11. A power take-off assembly, comprising:
    a shaft connecting an impeller to a pump rotor through a spline, and to a pinion through engaged axial splines, and supporting the pump rotor in rotation;
    an idler support;
    a pump support secured to a housing having an opening, the pump rotor fitted in the pump support, the pump support and idler support supporting an idler in rotation;
    a power takeoff gear driveably connected to the pinion.

12. The assembly of claim 11, further comprising:
    a housing having an opening and secured to the pump support; and
    wherein the pinion, the idler, and the power takeoff gear are radially aligned with the opening.

13. The assembly of claim 11, wherein the engaged axial splines comprise:
    first axial spline teeth located on the shaft;
    second axial spline teeth located at an axial end of the pinion and engaged with the first axial spline teeth.

* * * * *